(12) United States Patent
Zhang et al.

(10) Patent No.: US 12,311,476 B2
(45) Date of Patent: May 27, 2025

(54) WELDING DEVICE AND BATTERY WELDING DEVICE

(71) Applicant: CONTEMPORARY AMPEREX TECHNOLOGY (HONG KONG) LIMITED, Hong Kong (CN)

(72) Inventors: Yongli Zhang, Fujian (CN); Zhihua Wen, Fujian (CN); Keqiang Li, Fujian (CN); Yitai Guo, Fujian (CN); Cong Zhang, Fujian (CN); Yunru Shi, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 136 days.

(21) Appl. No.: 18/113,073

(22) Filed: Feb. 23, 2023

(65) Prior Publication Data

US 2023/0271278 A1 Aug. 31, 2023

(30) Foreign Application Priority Data

Feb. 28, 2022 (CN) .......................... 202220417733.5

(51) Int. Cl.
*B23K 20/00* (2006.01)
*B23K 20/10* (2006.01)
(Continued)

(52) U.S. Cl.
CPC .......... *B23K 37/0211* (2013.01); *B23K 20/10* (2013.01); *B23K 37/0247* (2013.01); *B23K 37/0426* (2013.01); *B23K 2101/36* (2018.08)

(58) Field of Classification Search
CPC .... B23K 20/10; B23K 2101/36; B23K 20/26; B23K 1/0004; B23K 11/115; B23K 11/36;
(Continued)

(56) References Cited

U.S. PATENT DOCUMENTS 2,066,791 A * 1/1937 McBain ............... B23K 11/315
219/89
2,583,575 A * 1/1952 Casson ................. B23K 11/20
228/265
(Continued)

FOREIGN PATENT DOCUMENTS

CN 106825890 A 6/2017
CN 107096990 A 8/2017
(Continued)

OTHER PUBLICATIONS

Extended European Search Report issued Aug. 7, 2023 in European Patent Application No. 23156863.5, 8 pages.
(Continued)

*Primary Examiner* — Erin B Saad
(74) *Attorney, Agent, or Firm* — XSENSUS LLP (57) ABSTRACT

A welding device may include a frame, a welding assembly, a fastening bracket, a protective pressure plate, a first drive mechanism, and a second drive mechanism; the welding assembly may include a first welding head and a second welding head that are arranged opposite each other, and the first welding head may be fastened on the frame; the fastening bracket may be movably provided on the frame, and the second welding head may be fastened on the fastening bracket; the protective pressure plate may be fastened on the fastening bracket or the second welding head; and the first drive mechanism may be drivingly connected to the fastening bracket and configured to drive the fastening bracket so that the second welding head may reach a position of a welding point and the protective pressure plate may press against a to-be-welded member.

20 Claims, 6 Drawing Sheets

(51) Int. Cl.
  *B23K 37/02* (2006.01)
  *B23K 37/04* (2006.01)
  *B23K 101/36* (2006.01)

(58) Field of Classification Search
  CPC ............. B23K 20/002; B23K 37/0435; H01M 50/566; H01M 50/516
  See application file for complete search history.

(56) References Cited

U.S. PATENT DOCUMENTS

| | | | | |
|---|---|---|---|---|
| 3,793,086 | A * | 2/1974 | Badger | H01M 50/529 219/91.23 |
| 3,947,290 | A * | 3/1976 | Matter | B23K 11/18 228/901 |
| 4,100,674 | A * | 7/1978 | Tiegel | H01M 50/528 29/623.5 |
| 5,316,620 | A * | 5/1994 | Hasegawa | H01L 21/02021 438/959 |
| 6,168,063 | B1 * | 1/2001 | Sato | B23K 20/10 228/49.1 |
| 2012/0055910 | A1 * | 3/2012 | Sakai | B23K 37/0435 219/127 |
| 2021/0098766 | A1 | 4/2021 | Ban et al. | |
| 2022/0126400 | A1 * | 4/2022 | Poggio | H01M 50/536 |
| 2023/0182239 | A1 * | 6/2023 | Bae | H01M 50/178 429/211 |
| 2023/0201953 | A1 * | 6/2023 | Bae | H01M 50/566 228/1.1 |

FOREIGN PATENT DOCUMENTS

| | | |
|---|---|---|
| CN | 208961225 U | 6/2019 |
| CN | 111430771 B | 8/2021 |
| CN | 113290312 A | 8/2021 |

OTHER PUBLICATIONS

Office Action issued Feb. 7, 2024 in European Patent Application No. 23 156 863.5.

* cited by examiner

WELDING DEVICE AND BATTERY WELDING DEVICE

CROSS-REFERENCE TO RELATED APPLICATION

The present application claims priority to Chinese Application No. 202220417733.5, filed Feb. 28, 2022, which is incorporated herein by reference in its entirety.

TECHNICAL FIELD

The utility model pertains to the technical field of ultrasonic welding, and more specifically relates to a welding device and a battery welding device.

BACKGROUND

Ultrasonic welding technology is highly advantageous in the tab welding process of traction batteries. When an existing ultrasonic welding device uses ultrasonic wave to weld a tab of a battery cell to an adapting sheet, a protective pressure plate needs to be pressed downward to fasten the battery cell, and then an ultrasonic welder is adjusted to a welding position through three-axis movements for ultrasonic welding. After welding is completed, the ultrasonic welder is adjusted back to the initial position through three-axis movements, and the protective pressure plate is lifted to leave the battery cell. The existing ultrasonic welding device needs to be adjusted in place through three-axis movements of its base, leading to low welding efficiency.

SUMMARY

Embodiments of the utility model aim to provide a welding device and a battery welding device, to resolve a technical problem of low efficiency of welding a to-be-welded member in the prior art.

To achieve the foregoing objective, the technical solutions used in the utility model are as follows: A first aspect of the utility model provides a welding device, including a frame, a welding assembly, a fastening bracket, a protective pressure plate, a first drive mechanism, and a second drive mechanism, where the welding assembly includes a first welding head and a second welding head that are arranged opposite each other, and the first welding head is fastened on the frame; the fastening bracket is movably provided on the frame, and the second welding head is fastened on the fastening bracket; the protective pressure plate is fastened on the fastening bracket or the second welding head; the first drive mechanism is drivingly connected to the fastening bracket and configured to drive the fastening bracket so that the second welding head reaches a position of a welding point and the protective pressure plate presses against a to-be-welded member; and the second drive mechanism is drivingly connected to the second welding head and configured to drive the second welding head to weld the to-be-welded member.

The second welding head of the welding device is fastened on the fastening bracket, and the protective pressure plate is fastened on the fastening bracket or the second welding head. When the to-be-welded member is being welded, the first drive mechanism can simultaneously drive the second welding head to reach the position of the welding point and drive the protective pressure plate to press against the to-be-welded member. After the second welding head reaches the position of the welding point, the second drive mechanism drives the second welding head reaching the position of the welding point to weld the to-be-welded member. The first drive mechanism of the welding device is connected to the second welding head and the protective pressure plate via the fastening bracket, and the first drive mechanism drives both the second welding head and the protective pressure plate via the fastening bracket, so as to compress and weld the to-be-welded member via one shaft, thereby improving welding efficiency.

In some embodiments, the welding assembly further includes an ultrasonic generator, the second welding head is connected to the ultrasonic generator, and the ultrasonic generator is fixedly connected to the fastening bracket. The welding device adopts ultrasonic welding, achieving fast welding speed, high welding strength, and stable welding process.

In some embodiments, the first drive mechanism includes a servo motor, a screw rod, and a screw nut, the servo motor is drivingly connected to the screw rod, the screw nut is provided on the screw rod and drivingly connected to the screw rod, the screw rod is provided on the frame, and the fastening bracket is connected to the screw nut. The first drive mechanism adopts the screw rod-driven structure, achieving high drive efficiency, high drive accuracy, and stable movement of the second welding head and the protective pressure plate. In addition, ball screw driving is essentially rolling friction with small frictional resistance, ensuring long service life.

In some embodiments, the second drive mechanism is an air cylinder, a fastening end of the air cylinder is installed on the screw nut, and a power output end of the air cylinder is drivingly connected to the fastening bracket. The second drive mechanism in this embodiment is an air cylinder, able to adjust the welding pressure on the second welding head by adjusting air pressure in the air cylinder. In addition, the air cylinder features simple structure and cost-efficient.

In some embodiments, the screw nut is provided with an installation plate, the installation plate is provided with a guide structure, and the fastening bracket is slidably provided on the guide structure to limit a movement direction of the fastening bracket. The guide structure is provided to limit movement direction of the fastening bracket, so that the second welding head and the protective pressure plate move in the preset direction, thereby improving welding accuracy of the first welding head and the second welding head.

In some embodiments, the guide structure includes a slide rail and a slide block, the slide block is slidably connected to the slide rail, and the fastening bracket is fastened on the slide block. The guide structure uses the slide rail and the slide block, with simple structure and easy installation, which can ensure the accuracy of the pressing direction of the protective pressure plate and the movement direction of the second welding head, thereby improving the welding accuracy of the welding device.

In some embodiments, the welding device further includes a third drive mechanism, and the third drive mechanism is drivingly connected to the frame to drive the frame to move. Before the welding, the third drive mechanism drives the frame to move, so as to drive the first welding head to reach the position of the welding point. After the welding is completed, the third drive mechanism drives the first welding head to leave the position of the welding point, so that the welding fixture moves the to-be-welded member from the position of the welding point, thereby avoiding interference between the welding fixture and the first welding head and improving the welding efficiency.

In some embodiments, the third drive mechanism is an electric cylinder, and a power output end of the electric cylinder is connected to the frame; the frame includes a base, and the power output end of the electric cylinder is installed on the base; and the base is provided with a guide column, and a fastening end of the electric cylinder is provided with a guide sleeve matching the guide column. The third drive mechanism is an electric cylinder that features high accuracy, high integration, and powerful environmental adaptability. A motor of the electric cylinder uses a drive mechanism such as a synchronous pulley, a gear, or a worm gear to drive the screw to rotate, which has advantages such as flexible cooperation, easy installation, high strength, small return clearance, long service life, good control performance, high control precision, and low maintenance costs. Guide structures that cooperate with each other are provided on the frame and the electric cylinder, to ensure the linear movement of the frame, thereby improving the movement accuracy of the first welding head.

In some embodiments, the protective pressure plate includes a connecting bracket and a protective plate movably connected to the connecting bracket, the protective plate is configured to press against the to-be-welded member, and the connecting bracket is connected to the fastening bracket; and a guide column is provided on the protective plate, a compression spring fits around the guide column, and a guide sleeve matching the guide column is provided on the connecting bracket. The protective plate and the connecting bracket in this embodiment are guided by the guide structure through cooperation of the guide sleeve and the guide column, which ensures that the protective pressure plate presses against the to-be-welded member consistently in the same direction, thereby avoiding deviation of the to-be-welded member due to deflection of the pressing direction of the protective pressure plate. The compression spring is provided, and the compression spring can act as a cushion while the to-be-welded member is being pressed by the protective plate, thereby preventing the protective plate from damaging the to-be-welded member.

A second aspect of the utility model provides a battery welding device, including a welding fixture and the foregoing welding device, where the to-be-welded member is an electrode assembly, the welding fixture is configured to fasten the electrode assembly, and the welding device is configured to weld the electrode assembly located at a welding point.

The battery welding device includes a welding fixture and the foregoing welding device. In welding of the electrode assembly, the welding fixture fastens the electrode assembly, and after the first welding head reaches the position of the welding point, the first drive mechanism can drive the second welding head to reach the position of the welding point and also drive the protective pressure plate to press against the electrode assembly. After the second welding head reaches the position of the welding point, the second drive mechanism drives the second welding head reaching the position of the welding point to weld the electrode assembly. The first drive mechanism of the battery welding device is connected to the second welding head and the protective pressure plate via the fastening bracket, and the first drive mechanism drives both the second welding head and the protective pressure plate via the fastening bracket, so as to compress and weld the electrode assembly via one shaft, thereby improving welding efficiency.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

To describe the technical solutions in the embodiments of the utility model more clearly, the following briefly describes the accompanying drawings required for describing the embodiments or the prior art. Apparently, the accompanying drawings in the following description show merely some of the embodiments of the utility model, and persons of ordinary skill in the art may still derive other drawings from these accompanying drawings without creative efforts.

Figure 1:
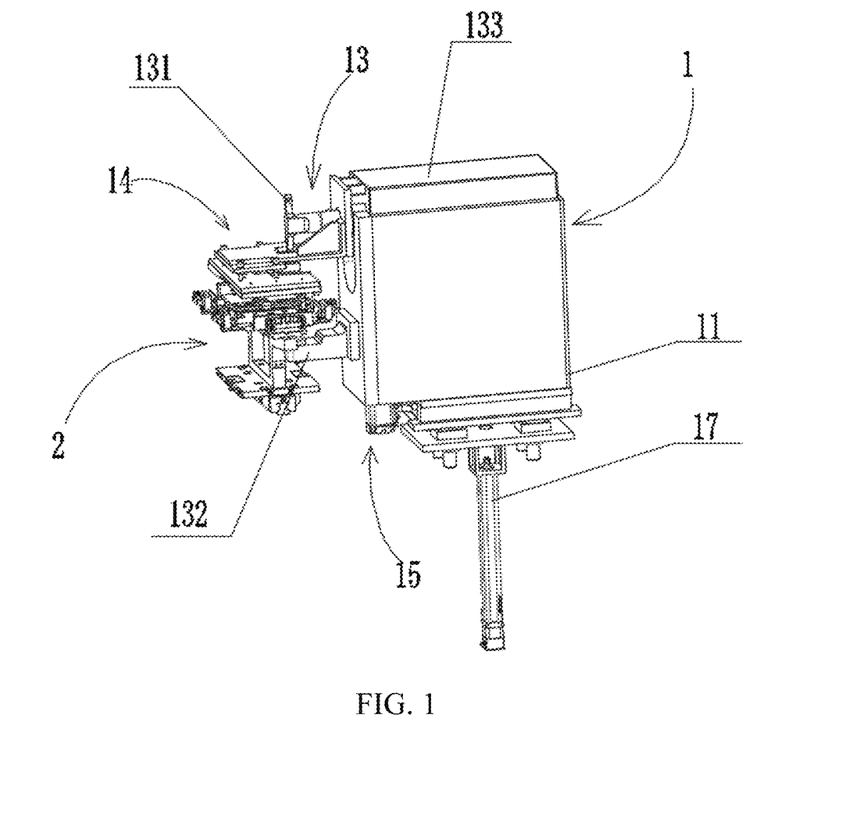
FIG. 1 is a schematic structural diagram of a welding device and a welding fixture at a viewing angle according to an embodiment of the utility model.

REFERENCE SIGNS IN THE FIGURE 1. welding device; 2. welding fixture; 11. frame; 12. fastening bracket; 13. welding assembly;
14. protective pressure plate; 15. first drive mechanism; 16. second drive mechanism; 111. base;
131. first welding head; 132. second welding head; 133. ultrasonic generator; 141. connecting bracket;
142. protective plate; 143. compression spring; 151. servo motor; 152. screw rod; 153. screw nut;
154. coupling; 161. slide rail; 162. slide block; and 17. third drive mechanism.

DESCRIPTION OF EMBODIMENTS

To make the objectives, technical solutions, and advantages of the embodiments of the utility model clearer, the following clearly and completely describes the technical solutions in the embodiments of the utility model with reference to the accompanying drawings in the embodiments of the utility model. Apparently, the described embodiments are some but not all of the embodiments of the utility model. All other embodiments obtained by persons of ordinary skills in the art based on the embodiments of the utility model without creative efforts shall fall within the protection scope of the utility model.

In the description of the utility model, it should be noted that the terms "include", "contain" and any other variants used herein mean to cover the non-exclusive inclusion, for example, a process, method, system, product, or device that includes a list of steps or units is not necessarily limited to those units, but may include other units not expressly listed or inherent to such a process, method, system, product, or device.

In addition, in this application, unless otherwise specified and defined explicitly, the terms "connect", "join", "fix", and "install" should be understood in their general senses. For example, the terms may refer to a mechanical connection or an electrical connection, or may refer to a direct connection, an indirect connection via an intermediate medium, an internal connection between two elements, or an interaction between two elements. Unless otherwise defined explicitly, persons of ordinary skill in the art can understand specific meanings of the foregoing terms in this application based on specific situations.

It should be understood that the orientations or positional relationships indicated by the terms "length", "width", "upper", "lower", "front", "rear", "left", "right", "perpendicular", "horizontal", "top", "bottom", "inside", "outside", and the like are based on the orientations or positional relationships shown in the accompanying drawings, are merely intended to facilitate the descriptions of the utility model and simplify the descriptions, are not intended to indicate or imply that the indicated apparatuses or components must have specific orientations, or be constructed and operated for a specific orientation, and therefore shall not be construed as a limitation to the utility model.

In addition, the terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features.

As a new type of secondary battery, lithium-ion batteries have advantages such as high energy density and power density, high working voltage, light weight, small size, long cycle life, good safety, and environmental friendliness, and has broad application prospects in portable electric appliances, electric tools, great energy storage, and power supplies for electric transportation. Currently, aluminum-shelled battery cells are most commonly used in lithium-ion batteries. A battery cell with multiple tabs is made through winding. The battery cell including multiple tabs is connected to a top cover through an adapting sheet. The tabs of the battery cell and the adapting sheet are usually connected through ultrasonic welding.

When an existing ultrasonic welder uses ultrasonic wave to weld a tab to an adapting sheet, a protective pressure plate needs to be pressed downward to cover the battery cell, and then an ultrasonic welder is adjusted to a welding position through three-axis movements for ultrasonic welding. After welding, the ultrasonic welder is adjusted to a zero position through three-axis movements (the three axes refer to three directions of X axis, Y axis and Z axis in the three-dimensional Cartesian coordinate system), and the protective pressure plate is lifted to leave the battery cell. The existing ultrasonic welder has the following disadvantages: First, it takes long for adjusting the welder to the position for welding through three-axis movements of the base. Second, a protective pressure plate is in an independent position, and after the welding fixture drives the battery cell in place, the protective pressure plate first presses against the battery cell for protection, which wastes time and reduces efficiency. Currently, the welding efficiency of the ultrasonic welder is usually improved by increasing the number of ultrasonic welders, which increases costs of devices. In view of the foregoing problems, the utility model provides a welding device and a battery welding device. The welding device in this application can also be applied to ultrasonic welding in another field.

The following describes in detail the welding device and the battery welding device provided in the utility model with reference to specific embodiments.

Figure 2:
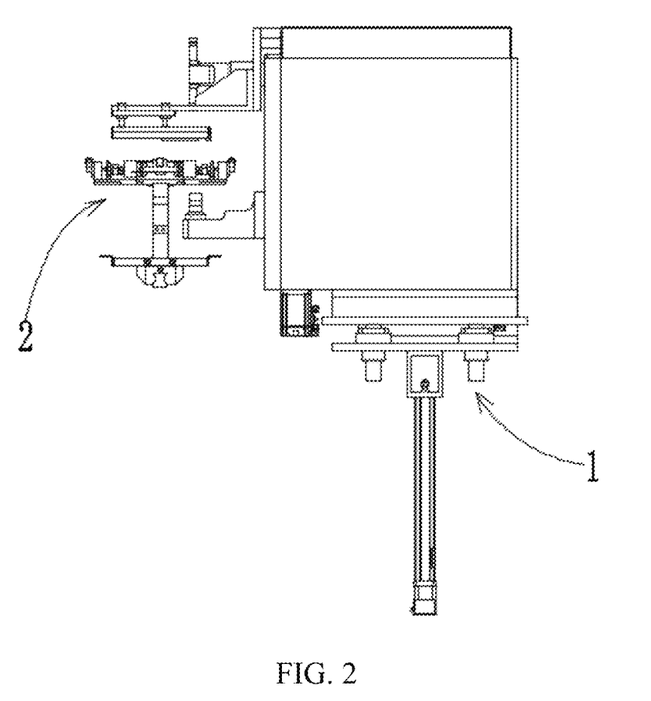
FIG. 2 is a schematic structural diagram of a welding device and a welding fixture at another viewing angle according to an embodiment of the utility model.
Figure 3:
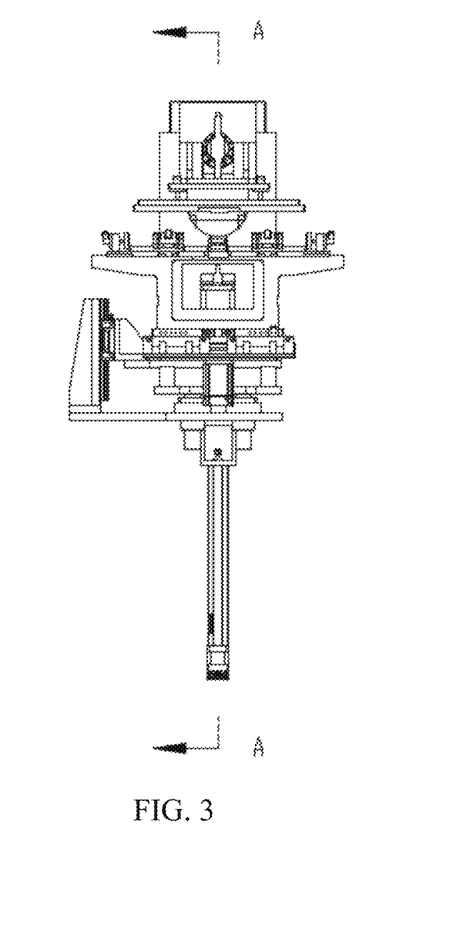
FIG. 3 is a schematic structural diagram of a welding device and a welding fixture at still another viewing angle according to an embodiment of the utility model.
Figure 4:
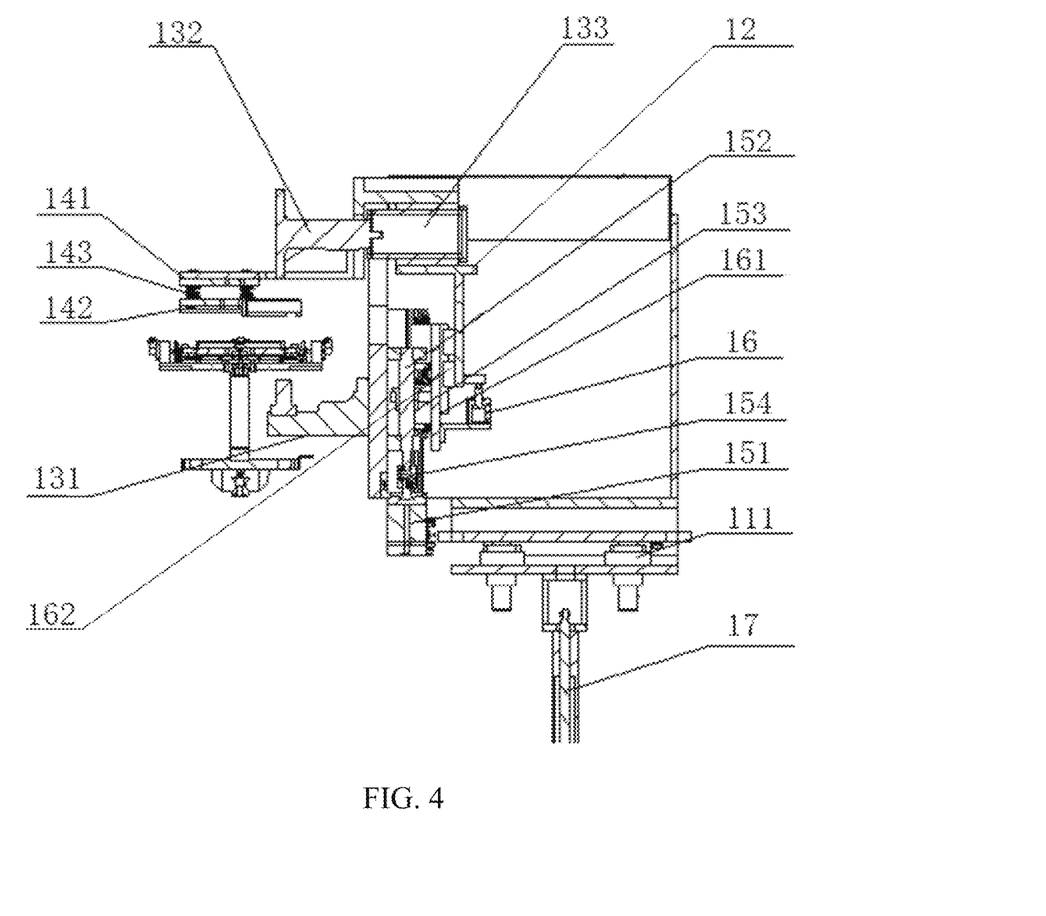
FIG. 4 is a schematic structural diagram of a cross section along A-A in FIG. 3.

FIG. 1 is a schematic structural diagram of a welding device and a welding fixture at a viewing angle according to an embodiment of the utility model. FIG. 2 is a schematic structural diagram of a welding device and a welding fixture at another viewing angle according to an embodiment of the utility model. FIG. 3 is a schematic structural diagram of a welding device and a welding fixture at still another viewing angle according to an embodiment of the utility model. FIG. 4 is a schematic structural diagram of a cross section along A-A in FIG. 3. As shown in FIG. 1 to FIG. 4, a first aspect of the embodiments of the utility model provides a welding device 1, including a frame 11, a fastening bracket 12, a welding assembly 13, a protective pressure plate 14, a first drive mechanism 15, and a second drive mechanism 16. The welding assembly 13 includes a first welding head 131 and a second welding head 132 that are arranged opposite each other, and the first welding head 131 is fastened on the frame 11. The fastening bracket 12 is movably provided on the frame 11, and the second welding head 132 is fastened on the fastening bracket 12. The protective pressure plate 14 is fastened on the fastening bracket 12. The first drive mechanism 15 is drivingly connected to the fastening bracket 12 and configured to drive the fastening bracket 12 so that the second welding head 132 reaches a position of a welding point and the protective pressure plate 14 presses against a to-be-welded member. The second drive mechanism 16 is drivingly connected to the second welding head 132 and configured to drive the second welding head 132 to weld the to-be-welded member.

The frame 11 is configured to mount the welding assembly 13, the fastening bracket 12, the protective pressure plate 14, the first drive mechanism 15, and the second drive mechanism 16. A specific size and material of the frame 11 are not specifically limited in this embodiment. To improve service life of the frame 11, the frame is generally a metal structure.

The welding assembly 13 includes the first welding head 131 and the second welding head 132, and the first welding head 131 mates with the second welding head 132 to finish welding the to-be-welded member. For example, the welding assembly 13 can be an ultrasonic welding assembly. For example, the first welding head 131 and the second welding head 132 are ultrasonic welding heads that cooperate with each other.

The protective pressure plate 14 is configured to press against the to-be-welded member in a welding process, to avoid movement of the to-be-welded member in the welding process which otherwise affects welding quality. A specific structure of the protective pressure plate 14 is not specifically limited in this embodiment. The protective pressure plate 14 in this embodiment is fastened on the fastening bracket 12. In another embodiment, the protective pressure plate 14 may alternatively fastened on the second welding head 132. The second welding head 132 and the protective pressure plate 14 in this embodiment are both connected to one shaft of the fastening bracket 12. Because the first drive mechanism 15 is drivingly connected to the fastening bracket 12, when driving the fastening bracket 12 to move, the first drive mechanism 15 in this embodiment drives both the second welding head 132 and the protective pressure plate 14 to move, so that the first drive mechanism 15 is drivingly connected to the second welding head 132 and the protective pressure plate 14 via one shaft. A specific structure and size of the fastening bracket 12 are not specifically limited in this embodiment.

The first drive mechanism 15 is configured to drive the fastening bracket 12 so that the second welding head 132 reaches the position of the welding point and the protective pressure plate 14 presses against the to-be-welded member. Because both the second welding head 132 and the protective pressure plate 14 are connected to the fastening bracket 12, when the first drive mechanism 15 drives the fastening bracket 12 to move, the second welding head 132 and the protective pressure plate 14 in this embodiment move synchronously. To be specific, the protective pressure plate 14 and the second welding head 132 complete compression and welding via one shaft.

The first drive mechanism 15 in this embodiment is configured to drive the fastening bracket 12, so that the fastening bracket 12 drives the second welding head 132 to reach the position of the welding point, and the protective pressure plate 14 to press against the to-be-welded member. A specific structure of the first drive mechanism 15 is not specifically limited in this embodiment.

The second drive mechanism 16 is configured to drive the second welding head 132 to weld the to-be-welded member. The second drive mechanism 16 in this embodiment drives the second welding head 132 to the position of the welding point and cooperate with the first welding head 131 to weld the to-be-welded member. A specific structure of the second drive mechanism 16 is not specifically limited in this embodiment. For example, the second drive mechanism 16 may be an air cylinder.

The second welding head 132 of the welding device is fastened on the fastening bracket 12, and the protective pressure plate 14 is fastened on the fastening bracket 12. In welding of the to-be-welded member, the first drive mechanism 15 can drive the second welding head 132 to reach the position of the welding point and also drive the protective pressure plate 14 to press against the to-be-welded member. After the second welding head 132 reaches the position of the welding point, the second drive mechanism 16 drives the second welding head 132 reaching the position of the welding point to weld the to-be-welded member. The first drive mechanism 15 of the welding device is connected to the second welding head 132 and the protective pressure plate 14 via the fastening bracket 12, and the first drive mechanism 15 drives both the second welding head 132 and the protective pressure plate 14 via the fastening bracket 12, to compress and weld the to-be-welded member via one shaft, thereby improving welding efficiency.

In some embodiments, referring to FIG. 1 and FIG. 4, the welding assembly further includes an ultrasonic generator 133, the second welding head 132 is connected to the ultrasonic generator 133, and the ultrasonic generator 133 and the protective pressure plate 14 are both connected to an end of the fastening bracket 12.

The welding assembly 13 of the welding device includes the ultrasonic generator 133. The welding device welds the to-be-welded member via ultrasonic welding. The ultrasonic welding is to transfer high-frequency vibration waves to surfaces of two to-be-welded objects to cause the surfaces of the two objects to rub against each other under pressure, so as to fuse molecular layers. The ultrasonic generator 133 is fixedly connected to the second welding head 132, and the welding device implements ultrasonic welding via cooperation of the second welding head 132 and the first welding head 131. The first welding head 131 in this embodiment is designed with knurling, and cooperates with the second welding head 132 to weld the to-be-welded member during the ultrasonic welding. A specific structure of the ultrasonic generator 133 in the welding device in this embodiment is not specifically limited.

The welding device in this embodiment adopts ultrasonic welding, achieving fast welding speed, high welding strength, and stable welding process. The welding device in this embodiment can be used for welding tabs in the electrode assembly, or welding tabs and an adapting sheet in the electrode assembly.

Figure 5:
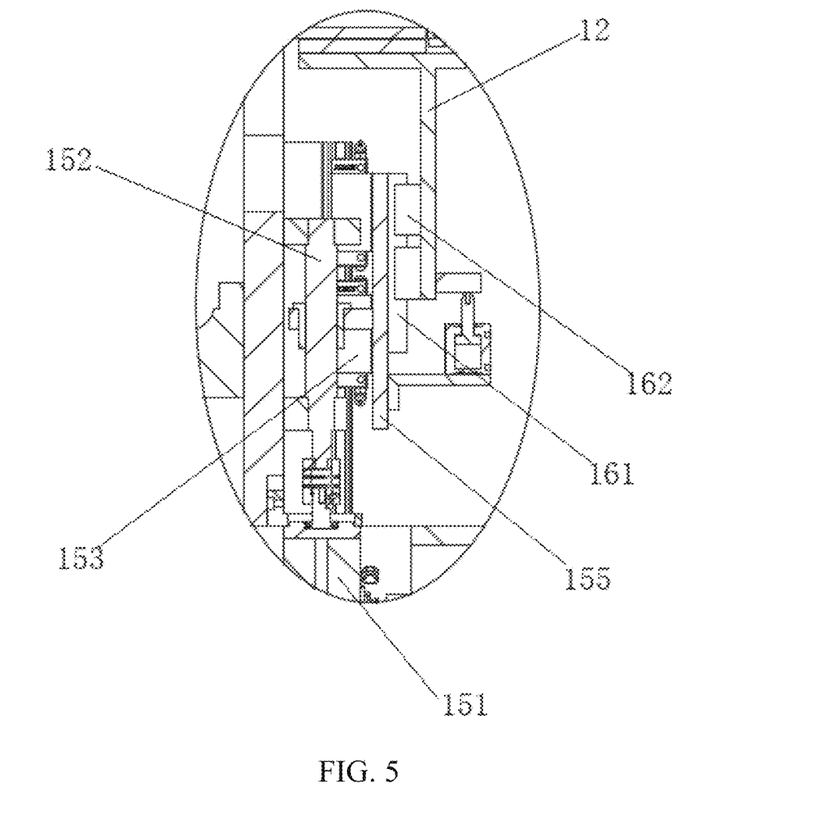
FIG. 5 is an enlarged schematic diagram of a local structure in FIG. 4.

In some embodiments, FIG. 5 is an enlarged schematic diagram of a local structure in FIG. 4. Referring to FIG. 1, FIG. 4, and FIG. 5, the first drive mechanism 15 is a screw rod-driven structure, the first drive mechanism includes a servo motor 151, a screw rod 152, and a screw nut 153, the servo motor 151 is drivingly connected to the screw rod 152, the screw nut 153 is provided on the screw rod 151 and drivingly connected to the screw rod 151, and another end of the fastening bracket 12 is connected to the screw nut 153.

The servo motor 151 in this embodiment is configured to drive the screw rod 152 to rotate. A specific form of the servo motor is not specifically limited in this embodiment. The screw rod 152 may be a slide screw rod or a rolling screw rod. For example, the screw rod 152 in this embodiment is a ball screw. The fastening bracket 12 is fastened on the screw nut 153. When the servo motor 151 drives the screw rod 152 to rotate, the screw nut 153 moves on the screw rod 152 linearly, and the screw nut 153 drives the fastening bracket 12 to move linearly, thereby driving the second welding head 132 and the protective pressure plate 14 to move linearly.

The first drive mechanism 15 in this embodiment is configured to drive the fastening bracket 12 so that the second welding head 132 reaches the position of the welding point and the protective pressure plate 14 presses against the to-be-welded member. The first drive mechanism 15 adopts the screw rod-driven structure, achieving high drive efficiency, high drive accuracy, and stable movement of the second welding head 132 and the protective pressure plate 14. In addition, ball screw driving is essentially rolling friction with small frictional resistance, thereby implementing long service life.

In some embodiments, referring to FIG. 4, the second drive mechanism 16 is an air cylinder, a fastening end of the air cylinder is installed on the screw nut 153, and a power output end of the air cylinder is drivingly connected to the fastening bracket 12.

The second drive mechanism 16 in this embodiment is configured to drive the second welding head 132 to weld the to-be-welded member, and the second drive mechanism 16 is a drive mechanism that can adjust welding force. The second drive mechanism 16 in this embodiment is an air cylinder, a power output end of the air cylinder (piston rod of the air cylinder) is fixedly connected to the fastening bracket 12, and the power output end of the air cylinder drives the fastening bracket 12 to move. Because the second welding head 132 is fixedly connected to the fastening bracket 12, the fastening bracket 12 drives the second welding head 132 to perform a welding motion. In this embodiment, the second drive mechanism 16 is an air cylinder. Adjusting air pressure in the air cylinder can change magnitude of pressure output by the air cylinder, thereby adjusting magnitude of welding force applied on the second welding head 132. For example, in the welding process, a technician can adjust the air pressure in the air cylinder based on a welding effect of the to-be-welded member, so as to adjust the welding force to make the welding effect of the welding device meet a preset requirement.

In this embodiment, the second drive mechanism 16 implements welding, and the second drive mechanism 16 is an air cylinder, facilitating adjustment of the welding pressure on the second welding head 132. In addition, the air cylinder has a simple structure and low cost.

In some embodiments, referring to FIG. 4 and FIG. 5, the screw nut 153 is provided with an installation plate 155, the installation plate 155 is provided with a guide structure, and the fastening bracket 12 is slidably provided on the guide structure to limit a movement direction of the fastening bracket 12.

The screw nut 153 in this embodiment is provided with the guide structure for limiting the movement direction of the fastening bracket 12, so that the fastening bracket 12 moves in the preset movement direction. Because the second welding head 132 and the protective pressure plate 14 are fixedly connected to the fastening bracket 12 directly or indirectly, the second welding head 132 and the protective pressure plate 14 move in a preset direction. For example, the first welding head 131 and the second welding head 132 in this embodiment are arranged vertically, and the guide structure limits movement of the second welding head 132 in the vertical direction, so that the second welding head 132 is always aligned with the first welding head 131. A specific structure of the guide structure is not specifically limited in this embodiment.

In this embodiment, the guide structure is provided to limit the movement direction of the fastening bracket 12, so that the second welding head 132 and the protective pressure plate 14 move in the preset direction and the second welding head 132 is always aligned with the first welding head 131, thereby improving welding accuracy of the first welding head 131 and the second welding head 132.

In some embodiments, referring to FIG. 4 and FIG. 5, the guide structure includes a slide rail 161 and a slide block 162, the slide block 162 is slidably connected to the slide rail 161, and the fastening bracket 12 is fastened on the slide block 162.

The guide structure in this embodiment is the slide rail structure, and the slide rail structure includes the slide rail 161 and the slide block 162. The slide rail 161 in this embodiment is installed on the installation plate, the fastening bracket 12 is fastened on the slide block 162, and the fastening bracket 12 moves along the slide rail 161, so that the second welding head 132 and the protective pressure plate 14 move in the preset direction. When the second drive mechanism 16 drives the fastening bracket 12 to move, the welding device can ensure that the second welding head 132 and the protective pressure plate 14 move in the preset direction, and ensure accuracy of a pressing direction of the protective pressure plate 14 and the movement direction of the second welding head 132, thereby ensuring the welding accuracy of the welding assembly.

The guide structure in this embodiment uses the slide rail 161 and the slide block 162, with simple structure and easy installation, which can ensure the accuracy of the pressing direction of the protective pressure plate 14 and the movement direction of the second welding head 132, thereby improving the welding accuracy of the welding device.

In some embodiments, referring to FIG. 1 and FIG. 4, the welding device further includes a third drive mechanism 17, and the third drive mechanism 17 is configured to drive the frame 11 to move.

The third drive mechanism 17 is configured to drive the frame 11 to move. For example, before welding, the third drive mechanism 17 drives the frame 11 to move to a welding position. Because the first welding head 131 is fastened on the frame 11, after the third drive mechanism 17 drives the frame 11 to the welding position, the first welding head 131 reaches the position of the welding point. Then the first drive mechanism 15 drives the fastening bracket 12 to cause the second welding head 132 to reach the position of the welding point and the protective pressure plate 14 to press against the to-be-welded member, and the second drive mechanism 16 drives the second welding head 132 to weld the to-be-welded member. After the welding is completed, the first drive mechanism 15 drives the protective pressure plate 14 and the second welding head 132 to leave the position of the welding point, and the third drive mechanism 17 drives the frame to cause the first welding head 132 to leave the position of the welding point.

In this embodiment, before the welding, the third drive mechanism 17 drives the frame 11 to move, so as to drive the first welding head 132 to reach the position of the welding point. After the welding is completed, the third drive mechanism 17 drives the first welding head 131 to leave the position of the welding point, so that the welding fixture moves the to-be-welded member from the position of the welding point, thereby avoiding interference between the welding fixture and the first welding head 131 and improving the welding efficiency.

In some embodiments, referring to FIG. 4, the third drive mechanism 17 is an electric cylinder, a power output end of the electric cylinder is connected to the frame 11, the frame 11 includes a base 111, the power output end of the electric cylinder is installed on the base 111, the base 111 is provided with a guide column, and a fastening end of the electric cylinder is provided with a guide sleeve matching the guide column.

The electric cylinder in this embodiment is configured to drive the frame 11 to move, so that the first welding head 131 reaches the position of the welding point. A specific structure of the electric cylinder is not specifically limited in this embodiment.

A specific structure of the electric cylinder is not specifically limited in this embodiment. The frame 11 in this embodiment includes the base 111, the power output end of the electric cylinder is installed on the base 111 in a simple installation way. The guide column is provided on the base 111, and the fastening end of the electric cylinder is provided with the guide sleeve. When the frame 11 is driven by the electric cylinder to move up and down, the guide column and the guide sleeve cooperate to guide the frame 11 to move linearly.

The third drive mechanism 17 in this embodiment is an electric cylinder that has high accuracy, high integration, and strong environmental adaptability. A motor of the electric cylinder drives the screw to rotate via a drive mechanism such as a synchronous pulley, a gear, or a worm gear, which has advantages such as flexible cooperation, easy installation, high strength, small return space, long service life, good control performance, high control precision, and low maintenance costs. Guide structures that cooperate with each other are provided on the frame and the electric cylinder, to ensure the linear movement of the frame, thereby improving the movement accuracy of the first welding head 131.

In some embodiments, referring to FIG. 1 and FIG. 4, the protective pressure plate 14 includes a connecting bracket 141 and a protective plate 142 connected to the connecting bracket 141 movably, the protective plate 142 is configured to press against the to-be-welded member, and the connecting bracket 141 is connected to the fastening bracket 12. The guide column is provided on the protective plate 142, a compression spring 143 fits around the guide column, and a guide sleeve matching the guide column is provided on the connecting bracket 141.

The protective pressure plate 14 includes the connecting bracket 141 and the protective plate 142, and the protective plate 142 is configured to press against the to-be-welded member in a welding process. A shape and size of the protective plate 142 in this embodiment can be preset based on a shape and size of the to-be-welded member, area of a pressing surface of the protective plate 142 is generally greater than area of a to-be-pressed surface of the to-be-welded member. The dimension of the protective plate 142 is not specifically limited in this embodiment. The connecting bracket 141 in this embodiment is fixedly connected to the fastening bracket 12, the protective plate 142 and the connecting bracket 141 are guided by the guide structure through cooperation of the guide sleeve and the guide column, and the compression spring 143 fits around the guide column. In this embodiment, the guide sleeve and the guide column cooperate to guide the pressing of the protective plate 142. Specific numbers of guide sleeves and guide columns are not specifically limited in this embodiment.

The protective plate 142 and the connecting bracket 141 in this embodiment are guided by the guide structure through cooperation of the guide sleeve and the guide column, which ensures that the protective pressure plate 14 presses against the to-be-welded member consistently in the same direction, thereby avoiding deviation of the to-be-welded member due to deflection of the pressing direction of the protective pressure plate 14. The compression spring 143 is provided, and the compression spring 143 can act as a cushion while the to-be-welded member is being pressed by the protective plate 142, thereby preventing the protective plate 142 from damaging the to-be-welded member.

Referring to FIG. 1 to FIG. 5, a second aspect of the embodiments of this application provides a battery welding device, including a welding fixture 2 and the welding device 1 in the foregoing embodiments, where the to-be-welded member is an electrode assembly, the welding fixture 2 is configured to fasten the electrode assembly, and the welding device 1 is configured to weld the electrode assembly at a position of a welding point.

The welding device 1 includes a frame 11, a fastening bracket 12, a welding assembly 13, a protective pressure plate 14, a first drive mechanism 15, and a second drive mechanism 16. The welding assembly 13 includes a first welding head 131 and a second welding head 132 that are arranged opposite each other, and the first welding head 131 is fastened on the frame 11. The fastening bracket 12 is movably provided on the frame 11, and the second welding head 132 is fastened on the fastening bracket 12. The protective pressure plate 14 is fastened on the fastening bracket 12 or the second welding head 132. The first drive mechanism 15 is drivingly connected to the fastening bracket 12 and configured to drive the fastening bracket 12 so that the second welding head 132 reaches a position of a welding point and the protective pressure plate 14 presses against a to-be-welded member. The second drive mechanism 16 is drivingly connected to the second welding head 132 and configured to drive the second welding head 132 to weld the to-be-welded member.

Figure 6:
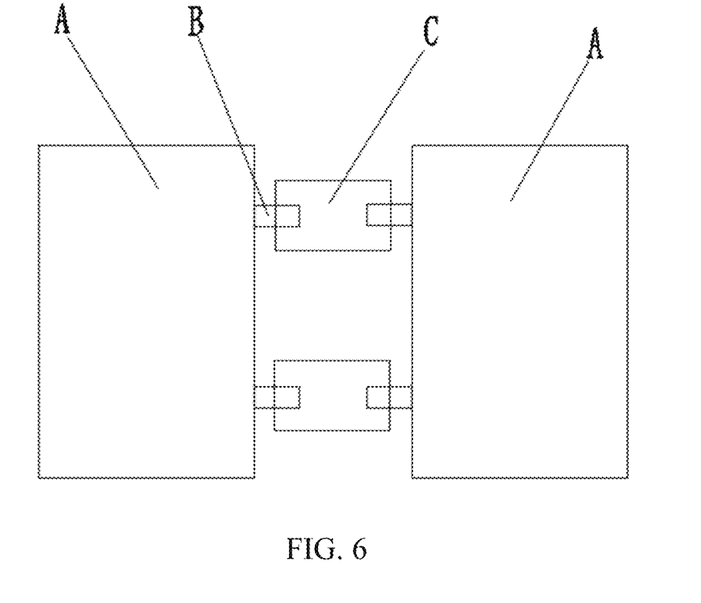
FIG. 6 is a schematic structural diagram of an electrode assembly in a welding process according to an embodiment of the utility model.

The battery welding device in this embodiment can be used to weld multiple tabs in a battery cell, for example, multiple positive tabs or multiple negative tabs in one battery cell. FIG. 6 is a schematic structural diagram of an electrode assembly in a welding process according to an embodiment of the utility model. Referring to FIG. 6, the battery welding device in this embodiment can also be used for welding tabs B and adapting sheets C of two battery cells A.

An operation procedure of the battery welding device in a specific embodiment is as follows:

A third drive mechanism 17 drives a frame 11 to move up to cause a first welding head 131 to move to a position of a welding point, a servo motor 151 of the first drive mechanism 15 rotates to drive coupling 154 and a screw rod 152 to rotate, the screw rod 152 rotates to drive a screw nut 153 to move down, the fastening bracket 12 moves down, and the second welding head 132 moves to the position of the welding point;

the protective pressure plate 14 in this embodiment is connected to the second welding head 132, the second welding head 132 moves down to drive the protective pressure plate 14 to move down and the protective pressure plate 14 to press against the battery cell; the compression spring is compressed, and the second welding head 132 moves down to the position of the welding point; and the second drive mechanism 16 drives the second welding head 132 via the fastening support 12 to apply welding pressure downward for ultrasonic welding; and     after the welding is completed, the servo motor 151 reversely rotates to lift the second welding head 132, and the third drive mechanism 17 drives the frame 11 to move down, leave the welding point, and return to an original position; and the welding fixture 2 changes its position for welding of a next battery cell.

The battery welding device provided in this embodiment of the utility model includes a welding fixture and the welding device in the foregoing embodiments. In welding of an electrode assembly, the welding fixture fastens the electrode assembly, and after the first welding head reaches the position of the welding point, the first drive mechanism can drive the second welding head to reach the position of the welding point and also drive the protective pressure plate to press against the electrode assembly. After the second welding head reaches the position of the welding point, the second drive mechanism drives the second welding head reaching the position of the welding point to weld the electrode assembly. The first drive mechanism of the battery welding device is connected to the second welding head and the protective pressure plate via the fastening bracket. The first drive mechanism drives both the second welding head and the protective pressure plate via the fastening bracket, to compress and weld the electrode assembly via one shaft, thereby improving welding efficiency.

The foregoing embodiments are merely intended for describing the technical solutions in the utility model, but not for limiting the utility model. Although the utility model is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions in the embodiments of the utility model.

In the foregoing description, the description referring to the term "an embodiment", "some embodiments", "an example", or "a specific example" means that a specific feature, structure, material or characteristic described with reference to the embodiment or example is included in at least one embodiment or example of the utility model. In this specification, illustrative expressions of these terms do not necessarily refer to the same embodiment or example. Moreover, the specific feature, structure, material, or characteristic described may be combined in any suitable manner in any one or more embodiments or examples. In addition, without mutual conflict, those skilled in the art may incorporate and combine different embodiments or examples and features of the different embodiments or examples described in this specification.

The invention claimed is:

1. A welding device, comprising:
a frame;
a welding assembly, wherein the welding assembly comprises a first welding head and a second welding head that are arranged opposite each other, and the first welding head is fastened on the frame;
a fastening bracket, movably provided on the frame, wherein the second welding head is fastened on the fastening bracket;
a protective pressure plate, fastened on the fastening bracket or the second welding head;
a first driver, drivingly connected to the fastening bracket and configured to drive the fastening bracket so that the second welding head reaches a position of a welding point and the protective pressure plate presses against a to-be-welded member; and
a second driver, drivingly connected to the second welding head and configured to drive the second welding head to weld the to-be-welded member,
wherein the welding assembly further comprises an ultrasonic generator, the second welding head is connected to the ultrasonic generator, and the ultrasonic generator is fixedly connected to the fastening bracket, and
the first driver comprises a servo motor, a screw rod, and a screw nut, the servo motor is drivingly connected to the screw rod, the screw nut is provided on the screw rod and drivingly connected to the screw rod, the screw rod is provided on the frame, and the fastening bracket is connected to the screw nut.

2. The welding device according to claim 1, wherein the second driver is an air cylinder, a fastening end of the air cylinder is installed on the screw nut, and a power output end of the air cylinder is drivingly connected to the fastening bracket.

3. The welding device according to claim 2, wherein the screw nut is provided with an installation plate, the installation plate is provided with a guide structure, and the fastening bracket is slidably provided on the guide structure to limit a movement direction of the fastening bracket.

4. The welding device according to claim 3, wherein the guide structure comprises a slide rail and a slide block, the slide block is slidably connected to the slide rail, and the fastening bracket is fastened on the slide block.

5. The welding device according to claim 1, wherein the welding device further comprises a third driver, and the third driver is drivingly connected to the frame to drive the frame to move.

6. The welding device according to claim 5, wherein the third driver is an electric cylinder, and a power output end of the electric cylinder is connected to the frame:
the frame comprises a base, and the power output end of the electric cylinder is installed on the base; and
the base is provided with a guide column, and a fastening end of the electric cylinder is provided with a guide sleeve matching the guide column.

7. The welding device according to claim 1, wherein the protective pressure plate comprises a connecting bracket and a protective plate connected to the connecting bracket movably, the protective plate is configured to press against the to-be-welded member, and the connecting bracket is connected to the fastening bracket; and
a guide column is provided on the protective plate, a compression spring fits around the guide column, and a guide sleeve matching the guide column is provided on the connecting bracket.

8. A battery welding device, comprising:
a welding fixture; and
the welding device according to claim 1, wherein the to-be-welded member is an electrode assembly, the welding fixture is configured to fasten the electrode assembly, and the welding device is configured to weld the electrode assembly located at a welding point.

9. A welding device, comprising:
a frame;
a welding assembly, wherein the welding assembly comprises a first welding head and a second welding head that are arranged opposite each other, and the first welding head is fastened on the frame;
a fastening bracket, movably provided on the frame, wherein the second welding head is fastened on the fastening bracket;
a protective pressure plate, fastened on the fastening bracket or the second welding head;
a first driver, drivingly connected to the fastening bracket and configured to drive the fastening bracket so that the second welding head reaches a position of a welding point and the protective pressure plate presses against a to-be-welded member; and
a second driver, drivingly connected to the second welding head and configured to drive the second welding head to weld the to-be-welded member,
wherein the welding device further comprises a third driver, and the third driver is drivingly connected to the frame to drive the frame to move;
the third driver is an electric cylinder, and a power output end of the electric cylinder is connected to the frame;
the frame comprises a base, and the power output end of the electric cylinder is installed on the base; and
the base is provided with a guide column, and a fastening end of the electric cylinder is provided with a guide sleeve matching the guide column.

10. The welding device according to claim 9, wherein the welding assembly further comprises an ultrasonic generator, the second welding head is connected to the ultrasonic generator, and the ultrasonic generator is fixedly connected to the fastening bracket.

11. The welding device according to claim 10, wherein
the first driver comprises a servo motor, a screw rod, and a screw nut, the servo motor is drivingly connected to the screw rod, the screw nut is provided on the screw rod and drivingly connected to the screw rod, the screw rod is provided on the frame, and the fastening bracket is connected to the screw nut.

12. The welding device according to claim 9, wherein the second driver is an air cylinder, a fastening end of the air cylinder is installed on a screw nut, and a power output end of the air cylinder is drivingly connected to the fastening bracket.

13. The welding device according to claim 12, wherein the screw nut is provided with an installation plate, the installation plate is provided with a guide structure, and the fastening bracket is slidably provided on the guide structure to limit a movement direction of the fastening bracket.

14. The welding device according to claim 13, wherein the guide structure comprises a slide rail and a slide block, the slide block is slidably connected to the slide rail, and the fastening bracket is fastened on the slide block.

15. The welding device according to claim 9, wherein the protective pressure plate comprises a connecting bracket and a protective plate connected to the connecting bracket movably, the protective plate is configured to press against the to-be-welded member, and the connecting bracket is connected to the fastening bracket; and
   a guide column is provided on the protective plate, a compression spring fits around the guide column, and a guide sleeve matching the guide column is provided on the connecting bracket.

16. A battery welding device, comprising:
a welding fixture; and
the welding device according to claim 9, wherein the to-be-welded member is an electrode assembly, the welding fixture is configured to fasten the electrode assembly, and the welding device is configured to weld the electrode assembly located at the welding point.

17. A welding device, comprising:
a frame;
a welding assembly, wherein the welding assembly comprises a first welding head and a second welding head that are arranged opposite each other, and the first welding head is fastened on the frame;
a fastening bracket, movably provided on the frame, wherein the second welding head is fastened on the fastening bracket;
a protective pressure plate, fastened on the fastening bracket or the second welding head;
a first driver, drivingly connected to the fastening bracket and configured to drive the fastening bracket so that the second welding head reaches a position of a welding point and the protective pressure plate presses against a to-be-welded member; and
a second driver, drivingly connected to the second welding head and configured to drive the second welding head to weld the to-be-welded member,
wherein the protective pressure plate comprises a connecting bracket and a protective plate connected to the connecting bracket movably, the protective plate is configured to press against the to-be-welded member, and the connecting bracket is connected to the fastening bracket; and
a guide column is provided on the protective plate, a compression spring fits around the guide column, and a guide sleeve matching the guide column is provided on the connecting bracket.

18. The welding device according to claim 17, wherein the welding assembly further comprises an ultrasonic generator, the second welding head is connected to the ultrasonic generator, and the ultrasonic generator is fixedly connected to the fastening bracket.

19. The welding device according to claim 18, wherein the first driver comprises a servo motor, a screw rod, and a screw nut, the servo motor is drivingly connected to the screw rod, the screw nut is provided on the screw rod and drivingly connected to the screw rod, the screw rod is provided on the frame, and the fastening bracket is connected to the screw nut.

20. A battery welding device, comprising:
a welding fixture; and
the welding device according to claim 17, wherein the to-be-welded member is an electrode assembly, the welding fixture is configured to fasten the electrode assembly, and the welding device is configured to weld the electrode assembly located at a welding point.

* * * * *